UNITED STATES PATENT OFFICE 1,922,315

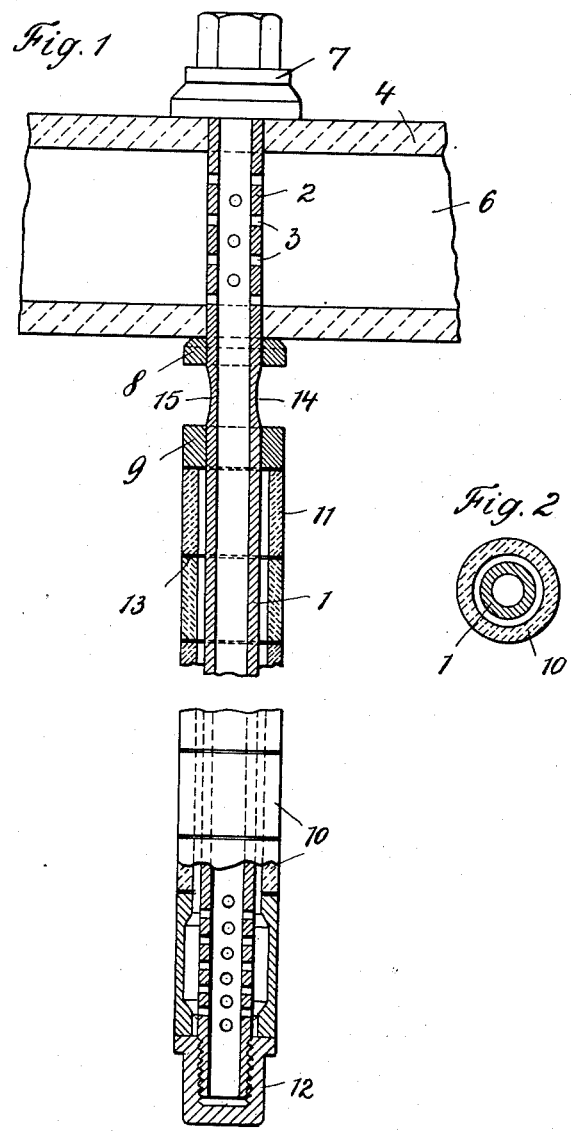

FILTER CANDLE

Wilhelm Mooz, Stassfurt, Germany, assignor to Kali-Chemie Aktiengesellschaft, Berlin, Germany Application November 20, 1930, Serial No. 497,052, and in Germany November 22, 1929

2 Claims. (Cl. 210—121)

This invention relates to filter candles and has for its object to provide a filter candle which is cheap and simple in construction and safe in operation.

A further object of the invention is the provision of a filter candle, which even when long, is not destroyed or damaged by the vibrations of the candle which cannot be avoided during the operation of a filter provided with filter candles.

In the accompanying drawing:

Fig. 1 is a vertical longitudinal section of an improved filter candle according to the invention.

Fig. 2 is a horizontal cross section according to Fig. 1.

The carrying tube 1 of the filter candle, which in the usual manner is mounted with its upper end 2 provided with perforations 3 in the two opposite walls 4 and 5 of the outlet chamber 6 for the filtrate by a nut 7, is provided with a collar 8 abutting against the exterior surface of the lower wall 5 of the outlet chamber 6. At a distance below the collar 8 is arranged a second collar 9 on the carrying tube 1 of the filter candle. The filtering parts of the filter candle consist of ceramic filter rings 10, arranged around the carrying tube 1, of which the upper filtering ring 11 is pressed against the lower surface of the collar 9 by a nut 12 screwed onto the perforated lower end of the carrying tube 1 and pressing all the filter rings 10 upwards, so that a candle is built up by the filter rings 10, the diameter of which is preferably not greater than their height. Packings 13 of rubber or the like may be arranged between the different filter rings 10 and the part 14 of the carrying tube 1 between the collars 8 and 9 may be provided with a groove or the like 15, thus decreasing the strength of the wall of the carrying tube 1 in the part 14.

The known filter candles of the kind described have only one collar corresponding to the collar 8 of the present invention against which the filter rings 10 are pressed. Thus the filter candle cannot easily follow the vibrations unavoidable in the operation of filter presses and these vibrations generally lead to rupture or complete destruction of at least the upper filter ring 11, thus making the whole filter candle inoperative.

By providing two collars 8 and 9 according to the invention the carrying tube can take up vibrations in the filter press without rupture of the filter rings. This is especially the case, when the wall of the part 14 of the carrying tube 1 is weakened, for example by a groove or the like 15, between the two collars 8 and 9.

I claim:

1. A filter candle comprising a carrying tube, a collar on the upper end of said carrying tube, means for fastening said carrying tube in a filter and for pressing said collar against a wall part of the filter, a second collar on said carrying tube arranged in spaced relation below said first collar, the walls of at least a part of said carrying tube between said collars being of less thickness than the walls of the remaining portion of the tube, filter rings arranged on said carrying tube below said second collar, and detachable means on said carrying tube carrying said filter rings and pressing them against said second collar.

2. A filter candle comprising a carrying tube, a collar on the upper end of said carrying tube, means for fastening said carrying tube in a filter and for pressing said collar against a wall part of the filter, a second collar on said carrying tube arranged in spaced relation below said first collar, the walls of at least a part of said carrying tube between said collars being of less thickness than the walls of the remaining portion of the tube, a plurality of ceramic filter rings arranged on said carrying tube below said second collar, packings between said filter rings, and a nut screwed onto the lower end of said carrying tube, said nut carrying said filter rings and pressing them against said second collar.

WILHELM MOOZ.